3,317,474
LATENT CATALYSTS FOR ACID-CATALYZED
REACTIONS
Joseph W. Jones, Jr., Kansas City, Mo., assignor, by mesne assignments, to Gulf Oil Corporation, Pittsburgh, Pa., a corporation of Pennsylvania
No Drawing. Filed May 21, 1963, Ser. No. 282,137
3 Claims. (Cl. 260—57)

This invention relates to catalysts for acid-catalyzed reactions. More specifically the invention concerns latent catalysts for curing synthetic resins. In more particular aspects the invention deals with compositions of uncured synthetic resins containing such catalysts, to methods of improving the pot life of such compositions, the methods of controlling the rate and uniformity of curing of synthetic resins, and to such resins cured by such methods.

Many synthetic resins such as aminoplasts, polyesters, phenolics and the like are useful in coatings, adhesives, moldings, textile treating and similar applications. For convenience of handling and use, such resins are commonly applied to a substrate or introduced into a mold or press in the uncured form, herein called the "precondensate" form. These precondensates are then cured in situ, commonly with the aid of an acid catalyst and heat, to provide the desired final product such as a coated or treated substrate, a laminated or molded article, or an adhesive bond.

In the use of resins as described above, the performance of the catalyst is highly important. In many instances it is necessary that there be relatively little premature curing of the precondensate prior to the curing step, i.e., the precondensate-catalyst mixture should have a long "pot life." If substantial premature curing occurs, the physical properties, especially the viscosity, of the precondensate-catalyst mixture will vary with time, thus making subsequent processing steps such as coating, molding, etc., difficult and often adversely affecting the quality of the finished product.

Also, it is usually important that the precondensate cure at a uniform rate, especially where it is necessary or desirable to employ relatively high temperatures in the curing step. For example, the exterior surface of a resin coating or a bonded, laminated article or molding should not cure at a rate appreciably higher than the interior; such differences in curing rate usually result in incomplete curing or in internal stresses which cause cracking, flaking and crazing of the cured resin.

I have now discovered precondensate-catalyst compositions which can be mixed and held for relatively long periods of time before use, but which also require only relatively short curing times at elevated curing temperatures. A particularly desirable feature of my invention is that the compositions cure at a substantially uniform rate throughout a coating or molding. This makes is possible to employ higher curing temperatures and, thus, even further reduce the curing time without sacrificing the uniformity of the cure.

The compositions of my invention comprise an acid-curable resin precondensate and a latent catalyst selected from the class consisting of: compounds of the formula

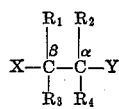

wherein X represents the residue of a strong acid resulting from the abstraction of acidic hydrogen, and wherein Y represents a Lewis base moiety, the basic atom of which is bonded to the alpha carbon atom, and wherein $R_1$, $R_2$, $R_3$ and $R_4$ represent hydrogen or lower alkyl; mineral acid salts of such compounds, especially halogen acid salts thereof; and mixtures of such compounds and such salts.

As used herein the term "acid-curable resin" is defined as any resin which, in its precondensate or uncured form, can be "cured," i.e., converted to its finished form, by a chemical reaction involving acid catalysts. The definition includes resins which are cured by further condensation or polymerization of the resin monomers and also includes resins which are cured by crosslinking finished polymers already present in the precondensate. Of course, the definition would also include resins which are cured by both further condensation or polymerization and by crosslinking.

Examples of resins which are cured by further polymerization or condensation of the resin monomers include the aminoplast resins such as urea-formaldehyde and melamineformaldehyde resins, the phenolic resins such as phenolformaldehyde resins, and other similar resins. Examples of resins which are cured by a crosslinking or a crosslinking and condensation mechanism include polyester resins which contain formaldehyde derivatives as crosslinking agents.

The latent catalysts which are useful in the practice of my invention may be further broadly described as 2-substituted alkyl esters of a strong acid in which the 2-substituents are Lewis base moieties, the base atom of which is bonded to the 2-carbon, acid salts of such esters and mixtures of such esters and salts. Referring now to the structural formula and accompanying description of these latent catalysts set out hereabove, it will be noted that the X component of the compound can, in accordance with the description and with the further broad description thereof, be the residue of a strong acid resulting from the abstraction of an acidic hydrogen from said acid.

By "strong acid" is meant any acid, either organic or inorganic, having a pK less than or equal to about 2, which includes, for example, inorganic acids such as the halogen acids, particularly the middle halogen acids (i.e., hydrochloric acid and hydrobromic acid), sulfuric acid, various sulfonic acids, phosphoric acid, various phosphonic acids, nitric acid, as well as various organic acids such as picric acid, formic acid, oxalic acid, trichloroacetic acid, and the like. Of the above mentioned classes of acids it is presently preferred that X be derived from one of the strong inorganic acids such as the middle halogen acids, sulfuric, nitric and phosphoric acids. Especially advantageous results are obtained when X is —Cl or —Br, and particularly when X is —Cl.

Another preferred class of strong acids is the organic derivatives of the above inorganic acids. Thus, when X is derived from a sulfonic or phosphonic acid such as $HSO_3R$ or $H_2PO_3R$, R may suitably be lower alkyl such as methyl, propyl, isobutyl and the like or may be aromatic, particularly monocyclic aryl such as xylyl, tolyl, phenyl and the like.

In the above structural formula and accompanying description the Y component of the latent catalyst compound is described as a Lewis base moiety in which the basic atom thereof is bonded to the alpha carbon atom of the catalyst compound. As used herein, the term "Lewis base" is intended to carry its usual connotation, i.e., a group capable of donating or providing an unshared pair of electrons to form a covalent bond. The Lewis base moieties referred to herein will most commonly be of the form $$A_nZ$$

Where Z represents the basic atom of the Lewis base, A represents the same or different substituents on the basic atom and $n$ equals the valence of Z minus one.

For example, in the latent catalysts employed in my invention, Z will typically represent nitrogen, oxygen or sulfur and A will typically represent hydrogen, alkyl, especially lower alkyl such as methyl, propyl, isobutyl, etc., and —($CH_2$—$CH_2$—X) wherein X, as noted in column 2, lines 1 and 2, represents the residue of a strong acid resulting from the abstraction of acidic hydrogen. A can also represent components capable of forming heterocyclic groups with Z such as

and certain aromatic groups such as phenyl.

Of the Lewis base moieties hereabove described, the residues of amines are presently preferred, especially the residues of secondary amines formed by abstracting the amino hydrogen from said amine. Among these secondary amines, some heterocyclic amines are especially advantageous. For example, in the latent catalysts used in my invention, it is generally preferred that the Lewis base components be groups such as

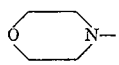

and the like, where X, $R_1$, $R_2$, $R_3$ and $R_4$ have the significance previously assigned.

Illustrative examples of the types of latent catalysts which can be employed in the practice of my invention include compounds having the structures:

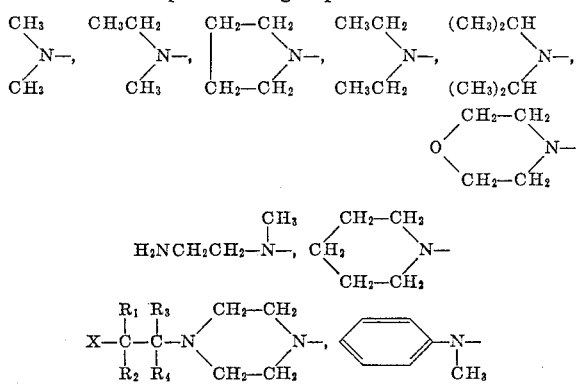

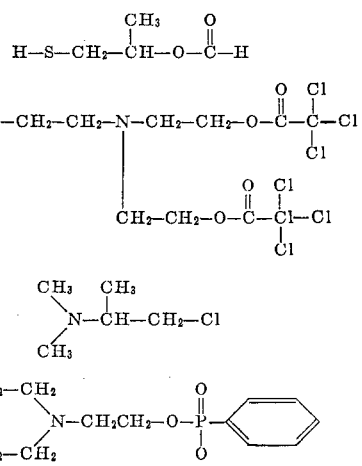

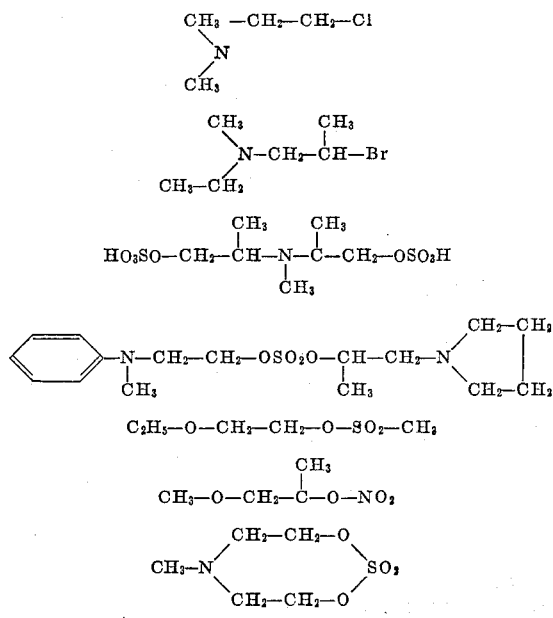

The compounds described above can be used in practicing my invention either in the form of the compound per se or in the form of their acid salts, preferably their mineral acid salts.

The acid salts of compounds described above, particularly the mineral acid salts, including the hydrochloride and sulfate salts, of the catalysts which have amino residues as the Lewis base components have especially advantageous properties and, therefore, constitute a preferred group of latent catalysts. When the Lewis base moiety is an amine the acid salt of the compound has improved stability prior to use.

The precondensate-catalyst compositions can be prepared by simply admixing the two components, suitably at room temperature. The compositions may also contain various extenders or filler materials such as wood flour, finely divided clays and the like and may also contain other ingredients such as pigments, plasticizers, viscosity modifiers and the like.

The amount of catalyst employed in my composition is not highly critical and will depend generally upon the nature of the particular precondensate being cured and, to some extent, upon the nature and quantities of the other ingredients in the composition. Actually, the amounts of such catalysts needed to bring about satisfactory cures is often surprisingly small, for reasons that are not yet understood. Thus, the exact amount of catalyst to be employed for any given precondensate may be determined by testing small trial batches which is within the skill of the average chemist. In any event the amount of catalyst to be incorporated into my compositions will ordinarily be at least a catalytic amount, i.e., an amount sufficient to produce the desired rate of curing of the precondensate at the selected curing temperature which will be at least equal to the catalyst activation temperature, although lesser amounts will be at least partially effective and larger amounts will not ordinarily be harmful except where the highest possible degree of "latency" is desired. As used herein the term "catalyst activation temperature" means the minimum temperature at which the catalyst has sufficient catalytic activity to produce commercially acceptable curing rates.

The novel latent catalysts herein described can also be used in conjunction with conventional curing catalysts such as, for example, ammonium sulfate, ammonium chloride, toluene sulfonic acid, phosphoric acid and the like. For example, less-than-catalytic amounts of such conventional catalysts can be employed, supplemented with additional amounts of my novel latent catalysts to obtain modified curing characteristics not obtainable from either type of catalyst alone.

EXAMPLE I

To 100 g. of cold (2° C.) urea-formaldehyde resin precondensate, is added 7.5 g. of $(NH_4)_2SO_4$ and the resulting composition is thoroughly mixed for one minute.

The precondensate-catalyst mixture is equally divided into three polyproylene test tubes which are simultaneously immersed in constant temperature baths maintained at 200° F., 160° F. and 120° F.

The time required for the viscosity of each sample to increase with continuous stirring to a value too high for use in commercial coating, adhesive or molding applications is measured and recorded. This time is defined herein as the "gel time" of the resin-catalyst mixture.

The above procedure is repeated twice; the average gel times of the three runs are set forth in Table A herebelow:

TABLE A

| Temperature ° F.: | Gel time, minutes |
|---|---|
| 200 | 7.2 |
| 160 | 9.4 |
| 120 | 35.7 |

EXAMPLE II

The procedure of Example I is repeated except the $(NH_4)_2SO_4$ cure catalyst is replaced by various quantities of (β-chloroethyl) dimethylamine hydrochloride (one run at each catalyst concentration). The results are:

TABLE B

| Wt. Catalyst (g./100 g. resin) | Temperature (° F.) | Gel Time (minutes) |
|---|---|---|
| 2 | 200 | 11.0 |
|   | 160 | 23.5 |
|   | 120 | 143.0 |
| 3 | 200 | 10.5 |
|   | 160 | 21.5 |
|   | 120 | 111.0 |
| 6 | 200 | 9.7 |
|   | 160 | 15.1 |
|   | 120 | 73.0 |
| 12 | 200 | 9.1 |
|   | 160 | 16.0 |
|   | 120 | 71.0 |

EXAMPLE III

The procedure of Example II is repeated except that the catalyst employed is (β-chloroethyl) diethylamine hydrochloride. The results are:

TABLE C

| Wt. Catalyst (g./100 g. resin) | Temperature (° F.) | Gel Time (minutes) |
|---|---|---|
| 2 | 200 | 7.9 |
|   | 160 | 13.6 |
|   | 120 | 75.0 |
| 3 | 200 | 7.3 |
|   | 160 | 13.8 |
|   | 120 | 55.0 |
| 6 | 200 | 7.3 |
|   | 160 | 10.6 |
|   | 120 | 46.2 |
| 12 | 200 | 6.5 |
|   | 160 | 10.1 |
|   | 120 | 36.1 |

EXAMPLE IV

The procedure of Example II is repeated except that the catalyst employed is (β-chloroisopropyl) dimethylamine hydrochloride. The results are:

TABLE D

| Wt. Catalyst (g./100 g. resin) | Temperature (° F.) | Gel Time (minutes) |
|---|---|---|
| 2 | 200 | 7.9 |
|   | 160 | 13.0 |
|   | 120 | 62.0 |
| 3 | 200 | 8.6 |
|   | 160 | 15.0 |
|   | 120 | 109.0 |
| 6 | 200 | 9.7 |
|   | 160 | 15.7 |
|   | 120 | 60.0 |
| 12 | 200 | 6.5 |
|   | 160 | 14.1 |
|   | 120 | 60.0 |

EXAMPLE V

The procedure of Example I is repeated using the latent catalysts specified in Table E instead of the $(NH_4)_2SO_4$ of Example I. The results are:

TABLE E

| Catalyst (3 g./100 g. resin) | Time (Minutes) | | |
|---|---|---|---|
| | 200° F. | 160° F. | 120° F. |
| (β-Chloroethyl) diisopropylamine hydrochloride | 4.0 | 7.3 | 86.0 |
| (Chloropropyl) dimethylamine hydrochloride | 20.5 | 75.0 | >1,440.0 |
| (γ-Chloro-β-methyl propyl)dimethylamine hydrochloride | 17.0 | 54.0 | |
| N-(β-chloroethyl) piperidine hydrochloride | 6.1 | 14.7 | 57.0 |
| N-(β-chloroethyl) pyrrolidine hydrochloride | 10.4 | 29.6 | |
| N-(β-chloroethyl) morpholine hydrochloride | 5.3 | 10.0 | 43.0 |
| Control (Av. of 3 runs), 7.5 g. $(NH_4)_2SO_4$/100 g. resin | 6.1 | 9.3 | 40.5 |

Note that the latent catalysts of Table E generally have substantially greater activity than $(NH_4)_2SO_4$ at the elevated curing temperature even though they are used in substantially lower amounts, while at lower temperatures, corresponding generally to commonly encountered storage and application temperatures, the activity of the novel latent catalysts is markedly lower than $(NH_4)_2SO_4$.

EXAMPLE VI

A urea-melamine precondensate is prepared by mixing 504 g. melamine, 876 g. of 37% formaline and 204 g. water in a heated reaction vessel, adjusting the pH of the mixture to 8.5 with dilute sodium hydroxide, heating at 80° C. for five hours with concurrent intermittent additions of further dilute sodium hydroxide to maintain the pH at about 8.5, raising the reaction temperature to reflux temperature (93° C.) for a period of 65 minutes. The precondensate has a mol ratio of formaldehyde to melamine of 2.7, 52% solids and a dilution number of 2.6.

To demonstrate the usefulness of the new latent catalysts with this particular resin precondensate, the procedure of Examples I and II is repeated. The results are:

TABLE F

| Curing Catalyst | | Gel Time (minutes) at— | | |
|---|---|---|---|---|
| Type | Amount, g./100 g. resin | 120° F. | 160° F. | 200° F. |
| None | | >1,440 | >160 | >160 |
| $(NH_4)_2SO_4$ | 7.5 | 14.3 | 6.4 | 3.6 |
| (β-chloroethyl) dimethylamine hydrochloride | 10.0 | 23.3 | 9.2 | 4.2 |

EXAMPLE VII

Run A 1840 g. of Aspen chips are tumbled in a rotary drum and sprayed with 148 g. of (a urea-formaldehyde resin) containing 18.4 g. ($\beta$-chloroethyl) diethylamine hydrochloride. The sprayed chips are placed in a 14 in. x 14 in. mold having a removable bottom and are spread evenly in the mold and pressed by hand into a pre-mat about 3 inches thick. The pre-mat is placed between aluminum cauls and is inserted into a press which is heated to 295° F. The pre-mat is heated for five minutes without pressure to duplicate the lag time encountered in commercial particle board production between placing treated chips in the hot press and forming the particle board under pressure. The pre-mat is then pressed to a nominal ¾ in. thickness (using stops to maintain this thickness) and is held in the press for ten minutes at 295° F.

Run B

The procedure of Run A is repeated except that 55.2 g. ammonium sulfate is substituted for the ($\beta$-chloroethyl) dimethylamine hydrochloride.

Tests

The particle board samples prepared in Runs A and B above are subjected to various standard tests to compare the performance of the curing catalysts. The results are:

|  | Run A | Run B |
|---|---|---|
| Specific Gravity | 41.5 | 44.2 |
| Moisture Content (wt. percent) | 4.7 | 4.7 |
| Internal Bond Strength [1] | 80 | 68 |
| Water Absorption | (*) | (*) |
| Screw Holding | (*) | (*) |
| Bending Tests: [2] |  |  |
| Deflection (inches) | 0.060 | 0.063 |
| Load | 300 | 400 |
| Modulus of Rupture | 3,700 | 4,100 |
| Modulus of Elasticity | 1.09×10⁶ | 1.20×10⁶ |

[1] Ultimate tensile strength perpendicular to plane of the board, corrected to standard density of 40.0 lb./ft.³
[2] ASTM Test Method No. E6-61.
*Substantially equal.

The specimens subjected to the internal bond tests are visually examined. The particle board of Run B has loose chips on the surfaces thereof, and the point of rupture is near the surface, indicating a "pre-cure" condition caused by non-uniformity in resin curing rate from the surface to the interior of the board. By contrast, the board prepared in Run A does not have loose surface chips and ruptures near the center of the board.

EXAMPLE VIII

A urea-formaldehyde resin precondensate is mixed with di(methoxyethyl) sulfate in an amount of 3 g./100 g. precondensate and the resulting mixture is employed as the adhesive in the hot press production of plywood. The plywood obtained is in all respects equal to or superior to plywood made under similar conditions but employing known curing catalysts such as $(NH_4)_2SO_4$ in the adhesive mixture. Furthermore, the adhesive composition containing the di(methoxyethyl) sulfate curing catalyst has significantly longer pot life than the adhesive mixture containing $(NH_4)_2SO_4$.

EXAMPLE IX

A mixture of 690 g. (2.0 mol) of 2,4,6-trioxo-s-triazine-1,3,5(2H,4H,6H)-tripropionic acid, 485.0 g. (4.66 mol) of neopentyl glycol and 97.2 g. (0.67 mol) adipic acid is heated for 6.5 hours at 145–150° C. to an acid number of 53.5 and is then diluted with a mixture of 1630 ml. $H_2O$ and 110 ml. concentrated (28%) $NH_4OH$ to give a solids content of 41% (wt. basis). To this mixture is added 30 parts by weight of hexamethoxymethyl melamine per 70 parts solids, the pH is adjusted to 8.5 by further addition of $NH_4OH$ and the mixture is then diluted with water to 30% solids. The resulting product is a polyester-type resin precondensate which is cured by both further condensation of the resin monomers and by crosslinking of the condensed monomers.

To a portion of this precondensate is added 2.0 parts by weight of ($\beta$-chloroisopropyl) dimethylamine hydrochloride per 98 parts of resin solids. The resulting mixture is sprayed upon 16 ounce molded polyethylene bottles which are then heated in an oven (air temperature= 245–250° F.) with cooling and inspection at 5 minute intervals. The resin precondensate coating is cured completely (as indicated by lack of tackiness and resistance to ethanol) in about 5–10 minutes. By contrast, a sample of the same precondensate without the ($\beta$-chloroisopropyl) dimethylamine hydrochloride requires over 20–30 minutes to cure at the same conditions.

EXAMPLE X

The procedure of Example IX is repeated except that the triazine monomer is replaced with 2.0 mol of trimellitic anhydride to form a resin. The curing catalyst employed is N-methyldiethanolamine ditosylate.

The resin is completely cured after 10 minutes at 245–250° F. whereas films of this resin will require 30 minutes curing at 350° F. when using 1% (based on resin solids) of a paratoluenesulfonic acid catalyst.

I claim:

1. A composition comprising an acid curable resin precondensate selected from the group consisting of urea-formaldehyde resin, melamine-formaldehyde resin, urea-melamine resin, phenol-formaldehyde resin, and a polyester resin containing a formaldehyde derivative crosslinking agent, and further comprising a latent curing catalyst selected from the group consisting of compounds of the formula:

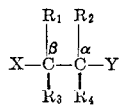

wherein X is the residue of a strong acid having a pK less than about 2 and resulting from the abstraction of acidic hydrogen, Y is a Lewis base moiety of the form $A_nZ$, where Z represents the basic atom of the Lewis base, said Z selected from the group consisting of N, O and S, A represents the same or different substituents on the basic atom, said A selected from the group consisting of hydrogen, lower alkyl, phenyl, —($CH_2$—$CH_2$—X), and lower alkyls capable of forming heterocyclic groups with Z, $n$ equals the valence of Z minus 1, wherein said Z is bonded to the alpha carbon atom and $R_1$, $R_2$, $R_3$, and $R_4$ are selected from the class consisting of hydrogen and lower alkyl; mineral acid salts of said compounds of said formula: and mixtures of said compounds of said formula and said salts.

2. The composition of claim 1 wherein said catalyst is a ($\beta$-haloalkyl) tertiary amine mineral salt.

3. The composition of claim 1 wherein said catalyst is a ($\beta$-chloroalkyl) dialkylamine hydrochloride.

References Cited by the Examiner

UNITED STATES PATENTS 2,687,397  8/1954  Dannenberg ____ 260—17.3 XR
3,133,031  5/1964  Maxwell et al. _____ 260—17.3

FOREIGN PATENTS 607,300  8/1948  Great Britain.

WILLIAM H. SHORT, *Primary Examiner*

SAMUEL H. BLECH, *Examiner*

L. P. QUAST, E. M. WOODBERRY,
*Assistant Examiners.*